May 18, 1954  J. O. THIBAULT  2,678,794
DIRIGIBLE SPOTLIGHT FRICTION MOUNTING
Filed April 30, 1949
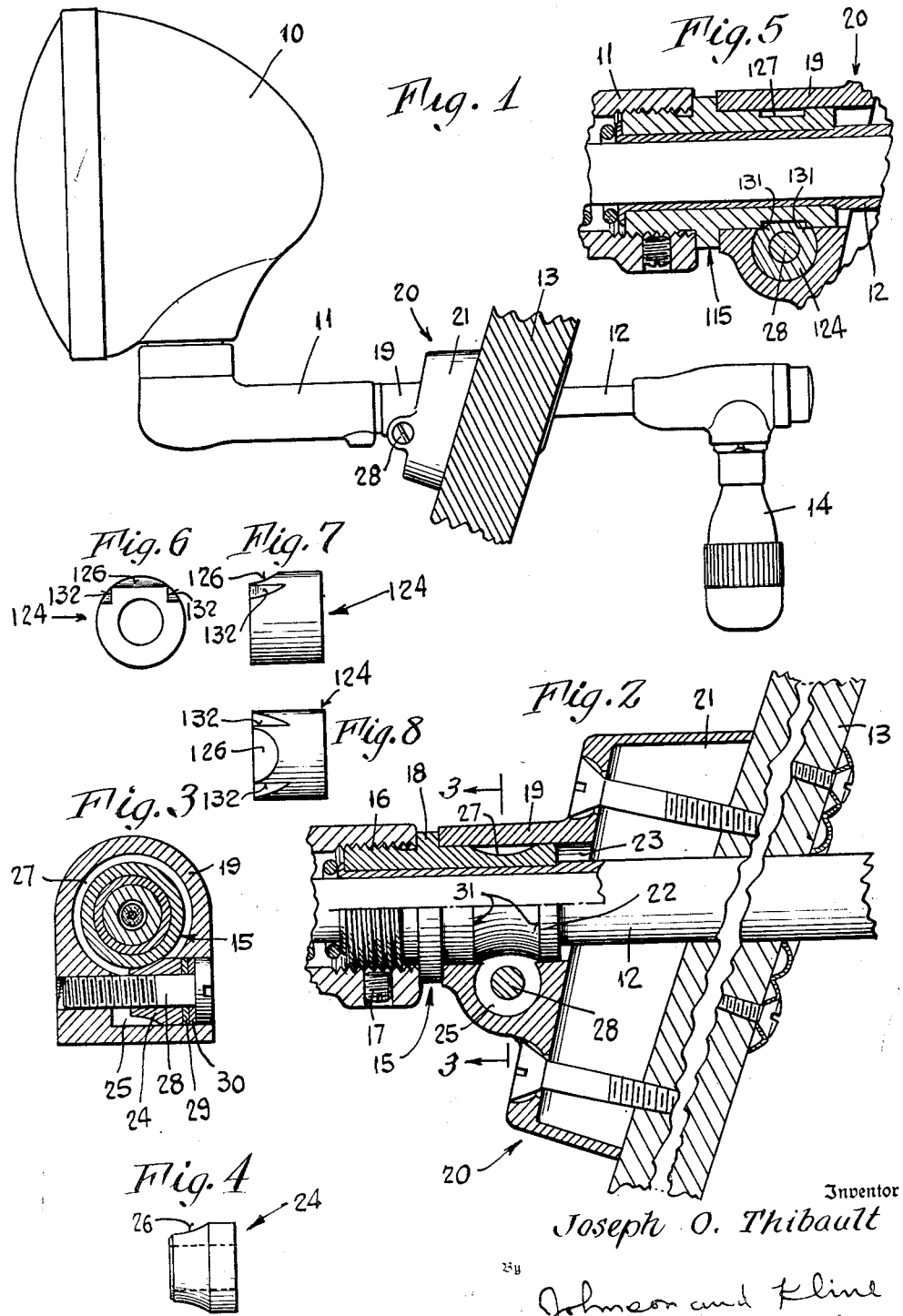
Inventor
Joseph O. Thibault
By Johnson and Kline Patented May 18, 1954

2,678,794

UNITED STATES PATENT OFFICE 2,678,794

DIRIGIBLE SPOTLIGHT FRICTION MOUNTING

Joseph O. Thibault, Bridgeport, Conn., assignor to Casco Products Corporation, Bridgeport, Conn., a corporation of Connecticut Application April 30, 1949, Serial No. 90,599

5 Claims. (Cl. 248—291)

This invention relates to dirigible spotlights of the type having a turnable shaft adapted to pass through a supporting wall, and more particularly to friction means carried by mounting brackets through which said shafts pass, by which the spotlights are held in adjusted position.

An object of the invention is to provide an improved shaft and mounting bracket assembly for a dirigible spotlight, having adjustable means for regulating the working friction between the shaft and bracket to hold the light in different adjusted positions, the said assembly being characterized by a desirable ease and fineness of adjustment of said friction.

Another object of the invention is to provide an improved shaft and mounting bracket assembly as above set forth, which has few parts of simple construction, and which may be quickly and economically fabricated.

A further object of the invention is to provide an improved shaft and bracket assembly according to the above, which is of strong and sturdy construction, and is reliable in use.

In accomplishing the above objects there is provided by the invention, in connection with a spotlight having a turnable part or shaft adapted to pass through a supporting wall and having a mounting part for securement to said wall, novel wedge means providing friction between said parts, and adjustable means acting on said wedge means, for regulating the friction exerted thereby between said parts.

In the illustrated embodiment of the invention the mounting part includes a sleeve through which the shaft passes, the sleeve having a transverse recess carrying a collar or washer provided with a sloping wall engaging the shaft. A screw passes through the collar and is threaded into a wall of the sleeve. When the screw is tightened it forces the collar inward, wedging it between the shaft and the opposite wall of the transverse recess in the sleeve. By this organization a very fine yet positive regulation of the friction between the sleeve and shaft is had, by merely tightening or loosening the screw, and the screw pressures required to exert a substantial friction and thereby hold the spotlight shaft securely in any adjusted position against dislodgement by vibration and the like, are relatively small due to the mechanical advantage afforded by the wedge action.

Adjustment of the friction may be quickly and easily effected as a consequence, with an assemblage which has few parts of simple construction, arranged to permit of economical fabrication.

The wedge action set forth above obviates the necessity for slotted sleeves or bushings such as were previously employed, thereby eliminating a slow and costly milling operation to produce said slots, as well as eliminating the relatively heavy pressures required of the draft screw heretofore employed in drawing together the sleeve to provide the desired friction. Consequently stripped threads are avoided, and broken ears or lugs with which the slotted sleeves have been provided for carrying the draft screws.

My improved wedge-type friction means, by overcoming the weaknesses of these prior devices, has resulted in a desirable and advantageous structure which is reliable and sturdy in use.

By providing cooperable, engageable shoulder surfaces on the shaft and friction member or collar, the shaft is securely held against axial movement in either direction. Thus the wedge means additionally functions as an advantageous stop.

Other features and advantages will hereinafter appear.

In the accompanying drawings:

Figure 1 is a side elevational view of a dirigible spotlight having the improved friction-regulating means of the invention.

Fig. 2 is an enlarged detail, partly in vertical section and partly in elevation, of the friction-regulating means.

Fig. 3 is a transverse vertical section, taken on line 3—3 of Fig. 2.

Fig. 4 is a side elevation of the friction member or collar of the regulating means.

Fig. 5 is a view like Fig. 2, but showing a modified form of friction means.

Fig. 6 is an end elevation of the friction collar of the device of Fig. 5.

Fig. 7 is a side elevation of the collar of Fig. 6, and

Fig. 8 is a top or plan view of the collar of Fig. 6.

The improved spotlight and mounting shown, referring to Fig. 1, comprises a lamp head 10 rotatably carried on a shaft housing or fitting 11, through which a shaft proper 12 extends. The shaft 12 passes through a supporting wall 13, and mounts on its inside end a handle 14 by which it may be manipulated or turned.

Referring to Fig. 2, the shaft has rigidly secured to it a bushing 15, provided with an externally threaded portion 16 screwed into one end of the housing 11 and locked thereto by a set screw 17. Intermediate its ends the bushing 15 has an annular rib 18 engaging the housing 11, and also engaging a sleeve portion 19 of a mounting bracket 20 which has a base 21 secured to the supporting wall 13.

The bushing 15 has a bearing portion 22 which is turnable in the bore 23 of the sleeve 19, whereby the shaft 12 may be turned in the bracket 20 to alter the position of the lamp head 10.

According to the present invention, novel improved adjustable means are provided for regulating the friction between the shaft 12 and the bracket 20, thereby to hold the lamp head in different adjusted positions, said means enabling easy, fine adjustment of the friction to be effected. This means comprises a wedging member in the form of a collar or washer 24 which is carried in a transverse recess 25 in the sleeve portion 19 of the bracket 20. The collar 24 has a sloping surface 26 engaging the bottom of an annular groove 27 in the bearing portion 22 of the bushing 23, whereby the collar may be wedged between the bushing and the opposite wall of the recess 25 in the sleeve 19.

For the purpose of forcing the collar inward into frictional engagement with the bushing 15, a screw 28 is provided, passing through the collar and threading into a wall of the sleeve 19 as clearly shown in Fig. 3. Preferably a flat washer 29 and a lock washer 30 are carried under the head of the screw 28, to provide for ease of turning of the screw and to prevent its loosening.

The opposite side walls of the groove 27 constitute shoulders 31 which respectively engage opposite surfaces of the collar 24. By this organization axial movement of the shaft 12 in either direction is positively prevented, the said shoulders functioning as effective stops.

Referring to Fig. 3 it will be seen that tightening of the screw 28 will force the collar 24 inward, into tight wedging engagement with the bushing 15 which is rigid on the shaft 12; loosening of the screw will allow the collar to retract or move outward. A continual tension, which is of importance in connection with my wedge-action friction device, will be maintained on the collar by virtue of the lock washer 30 placed under the head of the screw 28. I have found that this provides an advantageous fine regulation of the friction between the bracket 20 and the shaft 12, yet one which is positive or uniform and reliable.

To effect adequate holding of the lamp in its different adjusted positions only moderate pressures are required of the screw 28 due to the mechanical advantage provided by the wedge action; therefore the likelihood of the screw threads becoming stripped is obviated. The moderate screw pressures required also make it easy to turn the screw with an ordinary screw driver, without raising burrs at the screw-head slot, or deforming the screw head.

The above advantages are obtained with a structure which is extremely simple, having few parts, and which may therefore be economically assembled and fabricated. The structure is characterized by sturdiness and reliability, since there are no ears or lugs which must be drawn together by a draft screw, and which may under severe stress break off, or have threads stripped in them.

If a sufficiently heavy lock washer 30 is used, the screw 28 may be tightened only enough to partially compress or flatten the washer, whereby the pressure between the screw head and the collar 24 will be wholly under the control of the resilient, yieldable washer.

A modification of the invention is shown in Figs. 5 through 8. In Fig. 5 parts which are the same as those already described have been given the same reference characters.

The bracket 20 in Fig. 5 rotatably carries a bushing 115 having a groove 127 characterized by flat side walls 131. Engageable with the bushing 115 is a friction collar 124 having a curved surface 126 straddled by shoulders 132, the surface 126 contacting the bottom of the groove 127, and the shoulders 131 and 132 respectively engaging each other.

Operation of the device of Figs. 5 through 8 is similar to that already described for the preceding figures; however the collar 124 has a larger area of contact with the bushing 115 than exists between the collar 24 and bushing 15, reducing the tendency to wear.

Variations and modifications may be made within the scope of this invention and portions of the improvements may be used without others.

I claim:

1. In a dirigible spotlight of the type having a turnable part adapted to pass through a supporting wall, and having a mounting part for securement to said wall, one of said parts having a rigid sleeve provided with a bore of fixed diameter surrounding the other part, said sleeve having a transverse bore opening into its longitudinal bore, and having a threaded hole aligned with the transverse bore; wedge means including a collar disposed within said transverse bore, to provide friction between said parts, said collar having a sloping surface for engagement with said other part; and adjustable means acting on said collar, for regulating the friction exerted between said parts, said adjustable means including a screw passing freely through the collar and threading into a threaded hole of said sleeve.

2. In a dirigible spotlight of the type having a turnable part adapted to pass through a supporting wall, and having a mounting part for securement to said wall, one of said parts having a rigid sleeve provided with a bore of fixed diameter surrounding the other part, said other part having a friction surface and having an annular shoulder adjacent said friction surface and the sleeve having a transverse recess opening into its longitudinal bore, a portion of said recess being threaded; a friction member comprising a collar adjustably carried in said recess, engaging said shoulder to limit relative axial movement of said parts and having a sloping face engaging the said friction surface; and a screw threaded into the recess of the sleeve, and passing freely through the collar, causing the sloping surface of the latter to press against said friction surface of the other part whereby the friction between the two said parts can be regulated.

3. In a dirigible spotlight of the type having a turnable shaft adapted to pass through a supporting wall, and having a bracket for securement to said wall, provided with a rigid sleeve provided with a bore of fixed diameter surrounding said shaft, said shaft having a cylindrical friction surface and an annular shoulder adjacent said surface and the sleeve having a transverse recess; a friction member adjustably carried in the said recess opening into its longitudinal bore, said member having a shoulder engaging the shoulder of the shaft and preventing axial movement of the shaft in one direction and having a concave portion engaging the cylindrical surface of the shaft; and adjustable means causing the concave portion of the member to press against the cylindrical surface of the shaft whereby the friction between the shaft and sleeve can be regulated.

4. In a dirigible spotlight of the type having a turnable shaft adapted to pass through a supporting wall, and having a bracket for securement to said wall, provided with a rigid sleeve provided with a bore of fixed diameter surrounding said shaft, said shaft having a pair of oppositely-facing annular shoulders and a cylindrical friction surface between said shoulders and the sleeve having a transverse recess opening into its longitudinal bore; a friction member adjustably carried in the said recess, said member having a pair of oppositely-facing shoulders engaging respectively the shoulders of the shaft and preventing axial movement of the shaft in either direction and having a concave portion engaging the cylindrical surface of the shaft; and adjustable means causing the concave portion of the friction member to press against the shaft whereby the friction between the shaft and sleeve can be regulated.

5. The invention as defined in claim 2 wherein said screw has a head overlying a portion of said collar and wherein resilient yieldable means is interposed between the screw head and collar to control the pressure exerted by the collar against the friction surface.

References Cited in the file of this patent

UNITED STATES PATENTS

| Number | Name | Date |
| --- | --- | --- |
| 1,443,331 | Meyer | Jan. 23, 1923 |
| 1,830,355 | Farr | Nov. 3, 1931 |
| 2,226,897 | Cole | Dec. 31, 1940 |
| 2,323,473 | Korling | July 6, 1943 |
| 2,326,316 | Allen | Aug. 10, 1943 |
| 2,341,208 | Clark et al. | Feb. 8, 1944 |
| 2,448,278 | Ronning | Aug. 31, 1948 |